M. D. WELLS.
Harrow.

No. 52,233.

Patented Jan. 23, 1866.

Witnesses:

Inventor:

UNITED STATES PATENT OFFICE.

M. D. WELLS, OF MORGANTOWN, WEST VIRGINIA.

IMPROVEMENT IN HARROWS.

Specification forming part of Letters Patent No. 52,233, dated January 23, 1866.

*To all whom it may concern:*

Be it known that I, M. D. WELLS, of Morgantown, in the county of Monongalia and State of West Virginia, have invented a new and Improved Harrow; and I do hereby declare that the following is a full, clear, and exact description thereof, which will enable others skilled in the art to make and use the same, reference being had to the accompanying drawings, forming part of this specification, in which—

Figure 1:
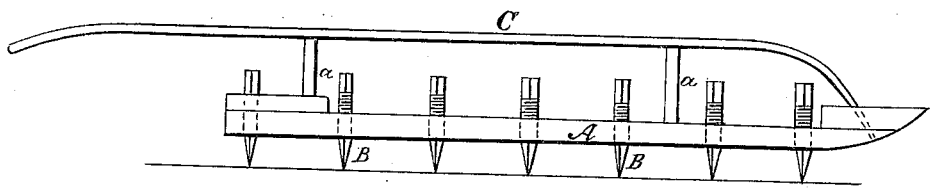
Figure 2:
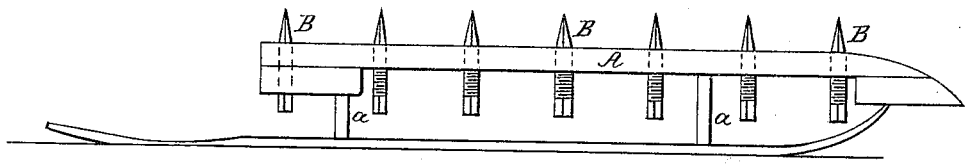
Figure 3:
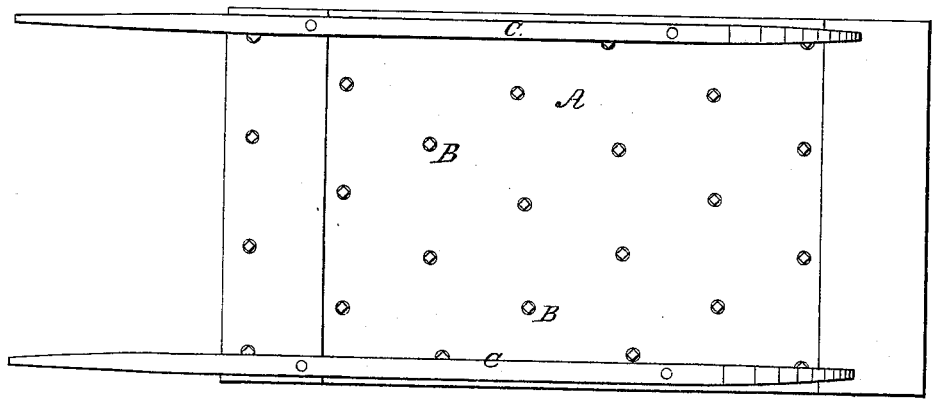

Figure 1 is a side view of my invention in an upright or working position; Fig. 2, a side view of the same in an inverted position resting upon its runners; Fig. 3, a plan or top view of the same.

Similar letters of reference indicate like parts.

The object of this invention is to obtain a harrow of simple construction, which will effectually pulverize the earth, crush the clods of earth, and leave a fine mold upon the surface without disturbing or tearing up the sod where plowed sod-ground is harrowed.

The invention has further for its object the ready conveyance of the harrow from place to place.

The invention consists in having the body of the harrow composed of a solid bed, of either wood or metal, turned up at the front end to admit of it being drawn over the ground, and having harrow-teeth fitted in it, whereby a harrow and clod-crusher are combined.

The invention further consists in having runners attached to the upper surface of the body or bed of the harrow, so that the latter, when required to be drawn from place to place, may be inverted, so as to rest upon the runners.

A represents the body or bed of the harrow, which may be constructed of wood or metal, of proper dimensions, and rounded up in front, so as to admit of being drawn over the ground without plowing it up. This body or bed has harrow-teeth B inserted in it at proper distances apart, said teeth projecting down below the body or bed at a suitable distance.

To the upper surface of the body or bed A there are attached uprights $a$, two at each side, said uprights serving as knees for runners C C. These runners project some distance beyond the rear end of the body or bed A, to serve as handles for the operator when the device is at work.

The teeth B sink into the earth until the body or bed A rests upon the surface. This depth of the penetration of the teeth is insured by the weight of the body or bed A, and if that weight is not sufficient for the purpose stones or other substances may be placed upon it. The body or bed A effectually crushes the clods on the surface of the earth, and at the same time prevents sods being raked up by the teeth B, while the latter completely cut up the earth or mold on the bottom of the sod.

The teeth of the ordinary harrow penetrate into the earth and tear or rake up the sods, causing the earth to be quite rough unless the ground is repeatedly harrowed. By my invention the ground is rendered very smooth by one passage over it, equally so as when harrowed three or four times by the ordinary harrow, which not only tears or rakes up the sods, but, instead of crushing the clods, simply throws them aside, and the teeth are not unfrequently clogged up by them.

My improved harrow is of very easy draft, and when it is to be drawn from place to place, the operator or driver simply inverts it, so that it will rest upon the runners C C, as shown in Fig. 2, and admit of being readily drawn to any place desired.

Having thus described my invention, I claim as new and desire to secure by Letters Patent—

1. A harrow composed of a solid body or bed A, rounded upward at its front end, and having teeth B inserted in it, substantially as and for the purpose herein set forth.

2. In combination with the body or bed A, having the teeth B inserted in it, the runners C C, attached to the upper surface of A, with their rear ends projecting beyond the rear end of the harrow to form the handles, substantially as and for the purpose specified.

The above specification of my invention signed by me this 20th day of October, 1865.

M. D. WELLS.

Witnesses:
H. B. LAZIER,
T. J. MEEKS.